US009335171B2

(12) United States Patent
Iida et al.

(10) Patent No.: US 9,335,171 B2
(45) Date of Patent: May 10, 2016

(54) TRAVEL TRACE STORAGE APPARATUS

(75) Inventors: Masahiro Iida, Kariya (JP); Ikuro Sato, Yokohama (JP); Nobuhiro Mizuno, Ichihara (JP)

(73) Assignee: DENSO CORPORATION, Kariya (JP)

( * ) Notice: Subject to any disclaimer, the term of this patent is extended or adjusted under 35 U.S.C. 154(b) by 152 days.

(21) Appl. No.: 14/122,809

(22) PCT Filed: Aug. 23, 2012

(86) PCT No.: PCT/JP2012/005279
§ 371 (c)(1),
(2), (4) Date: Nov. 27, 2013

(87) PCT Pub. No.: WO2013/027404
PCT Pub. Date: Feb. 28, 2013

(65) Prior Publication Data
US 2014/0095067 A1    Apr. 3, 2014

(30) Foreign Application Priority Data

Aug. 24, 2011 (JP) ................................ 2011-182641
Jun. 29, 2012 (JP) ................................ 2012-146982

(51) Int. Cl.
G01C 21/00 (2006.01)
G01S 19/40 (2010.01)
G01S 19/49 (2010.01)
G01C 21/16 (2006.01)
G01C 21/32 (2006.01)

(52) U.S. Cl.
CPC .............. *G01C 21/00* (2013.01); *G01C 21/165* (2013.01); *G01C 21/32* (2013.01); *G01S 19/40* (2013.01); *G01S 19/49* (2013.01)

(58) Field of Classification Search
CPC ...... G01C 21/00; G01C 21/165; G01C 21/32; G01S 19/40; G01S 19/49
See application file for complete search history.

(56) References Cited

U.S. PATENT DOCUMENTS 5,367,463 A     11/1994  Tsuji
2006/0293852 A1 12/2006  Tsurumi
2011/0172913 A1  7/2011  Nakamura et al.

FOREIGN PATENT DOCUMENTS

| JP | 2000-241179 A | 9/2000 |
| JP | 2001-108450 A | 4/2001 |
| JP | 2003-279362 A | 10/2003 |
| JP | 2004-069536 A | 3/2004 |
| JP | 2006-137262 A | 6/2006 |
| JP | 2007-248321 A | 9/2007 |
| JP | 2012-007939 A | 1/2012 |

OTHER PUBLICATIONS

International Search Report and Written Opinion of the International Searching Authority mailed Nov. 13, 2013 for the corresponding international application No. PCT/JP2012/005279 (with English translation).
Office Action issued Sep. 14, 2015 in the corresponding CN application No. 201280037788.2 (with English translation).

*Primary Examiner* — John Q Nguyen
*Assistant Examiner* — Kyung Kim
(74) *Attorney, Agent, or Firm* — Posz Law Group, PLC

(57) ABSTRACT

A travel trace storage apparatus includes a location detection device, a positioning trace generation device, a movement distance detection device, a travel direction detection device, a dead reckoning trace generation device for generating a dead reckoning trace, in which each vector determined by a vehicle movement distance and a vehicle travel direction is chronologically arranged, a correction positioning trace generation device for generating a correction positioning trace obtained by removing a location distant from the dead reckoning trace by a predetermined distance or more, a correction dead reckoning trace generation device for generating a correction dead reckoning trace obtained by correcting the dead reckoning trace, an absolute trace generation device for generating an absolute trace obtained by synthesizing the correction positioning trace and the correction dead reckoning trace, an absolute trace memory for storing the absolute trace.

7 Claims, 10 Drawing Sheets

FIG. 10

$$\begin{pmatrix} U_1 & U_2 & \dots & U_i & \dots & U_n \\ V_1 & V_2 & \dots & V_i & \dots & V_n \end{pmatrix} = C1 \cdot \begin{pmatrix} X_1 & X_2 & \dots & X_i & \dots & X_n \\ Y_1 & Y_2 & \dots & Y_i & \dots & Y_n \\ 1 & 1 & \dots & 1 & \dots & 1 \end{pmatrix} \quad \dots (1)$$

FIG. 11

$$C1 = \begin{pmatrix} R1 & -R2 & T1 \\ R2 & R1 & T2 \end{pmatrix}$$

FIG. 12

$$\begin{pmatrix} X_1' & X_2' & \dots & X_i' & \dots & X_n' \\ Y_1' & Y_2' & \dots & Y_i' & \dots & Y_n' \end{pmatrix} = C1 \cdot \begin{pmatrix} X_1 & X_2 & \dots & X_i & \dots & X_n \\ Y_1 & Y_2 & \dots & Y_i & \dots & Y_n \\ 1 & 1 & \dots & 1 & \dots & 1 \end{pmatrix} \quad \dots (2)$$

FIG. 15

$$\begin{pmatrix} U_1 & U_2 & \ldots & U_i & \ldots & U_n \\ V_1 & V_2 & \ldots & V_i & \ldots & V_n \end{pmatrix} = C2 \cdot \begin{pmatrix} X_1 & X_2 & \ldots & X_i & \ldots & X_n \\ Y_1 & Y_2 & \ldots & Y_i & \ldots & Y_n \\ 1 & 1 & \ldots & 1 & \ldots & 1 \end{pmatrix} \quad \cdots (3)$$

FIG. 16

$$C2 = \begin{pmatrix} c1 & c2 & c3 \\ c4 & c5 & c6 \end{pmatrix}$$

FIG. 17

$$\begin{pmatrix} X_1' & X_2' & \ldots & X_i' & \ldots & X_n' \\ Y_1' & Y_2' & \ldots & Y_i' & \ldots & Y_n' \end{pmatrix} = C2 \cdot \begin{pmatrix} X_1 & X_2 & \ldots & X_i & \ldots & X_n \\ Y_1 & Y_2 & \ldots & Y_i & \ldots & Y_n \\ 1 & 1 & \ldots & 1 & \ldots & 1 \end{pmatrix} \quad \cdots (4)$$

TRAVEL TRACE STORAGE APPARATUS

CROSS REFERENCE TO RELATED APPLICATIONS

This present disclosure is a U.S. national stage application of PCT/JP2012/005279 filed on Aug. 23, 2012, and is based on Japanese Patent Application No. 2011-182641 filed on Aug. 24, 2011 and Japanese Patent Application No. 2012-146982 filed on Jun. 29, 2012, the disclosures of which are incorporated herein by reference.

TECHNICAL FIELD

The present disclosure relates to a travel trace storage apparatus for storing a travel trace of a vehicle.

BACKGROUND ART

Conventionally, a technology is considered in which a travel trace of a vehicle is stored and a road shape is learned based on the travel trace. As the travel trace, a dead reckoning trace and an absolute trace are known. The dead reckoning trace is a trace that a travel vector, which is determined by a detection value of a speed sensor, a gyro sensor, or the like, of the vehicle is chronologically arranged. The absolute trace is a trace obtained by synthesizing the dead reckoning trace with a positioning trace, which is generated based on a received electric wave from a positioning satellite such as a GPS satellite, or the like.

Here, in some cases, by the dead reckoning trace, an accurate data about a distance, a curvature of a curve, or the like may not be obtained to an extent where a travel control of the vehicle is performed well. In addition, the dead reckoning trace does not include absolute coordinates. Therefore, the absolute trace rather than the dead reckoning trace tends to be used for the travel control of the vehicle.

However, since the absolute trace uses the positioning trace based on the electric wave received from the positioning satellite, the following difficulty may occur.

Thus, it may occur that, in a place surrounded by high-rises or the like, for example, the electric wave from the positioning satellite is reflected by buildings or the like, and that a car navigation device receives the electric wave from multiple pathways. This phenomenon is known as a multipath phenomenon. In a place where the multipath phenomenon occurs, the car navigation device can not accurately detect a location of the vehicle, and therefore, the car navigation device can not generate the accurate positioning trace. Thus, when the absolute trace is used as a trace for the travel control of the vehicle, it may be a subject to remove an influence by the multipath phenomenon.

As a technology for removing the influence by the multipath phenomenon, in Patent Document 1, a technology is disclosed in which a receiver sensitivity of a GPS signal is reduced in a place where the multipath phenomenon is prone to occur, so that a positioning calculation is not performed. However, in the described technology in Patent Document 1, since the calculation of the trace is performed in real time when the vehicle travels in the place where the multipath phenomenon is prone to occur, a removal of the influence by the multipath phenomenon may be insufficient.

PRIOR ART DOCUMENT

Patent Document

Patent Document 1: Japanese Unexamined Patent Publication No. 2006-242911.

SUMMARY OF THE INVENTION

It is an object of the present disclosure to provide a travel trace storage apparatus for generating an absolute trace more accurately when the absolute trace is used as the travel trace of the vehicle.

According to one embodiment of the present disclosure, the travel trace storage apparatus includes a location detection device, a positioning trace generation device, a movement distance detection device, a travel direction detection device, a dead reckoning trace generation device, a correction positioning trace generation device, a correction dead reckoning trace generation device, an absolute trace generation device, and an absolute trace memory. The location detection device chronologically detects a vehicle location based on an electric wave received from a satellite. The positioning trace generation device generates a positioning trace, in which each of vehicle locations is chronologically arranged, each of vehicle locations having been measured by the location detection device. The movement distance detection device chronologically detects a vehicle movement distance. The travel direction detection device chronologically detects a vehicle travel direction. The dead reckoning trace generation device generates a dead reckoning trace, in which each vector is chronologically arranged, each vector being determined by a corresponding vehicle movement distance detected by the movement distance detection device, and a respective vehicle travel direction being detected by the travel direction detection device. The correction positioning trace generation device generates a correction positioning trace, which is obtained by removing a location that is distant from the dead reckoning trace by a predetermined distance or more from each of locations included in the positioning trace under a condition that the positioning trace generated by the positioning trace generation device is superposed on the dead reckoning trace generated by the dead reckoning trace generation device. The correction dead reckoning trace generation device generates a correction dead reckoning trace, which is obtained by correcting the dead reckoning trace based on the correction positioning trace. The dead reckoning trace is generated by the dead reckoning trace generation device, and the correction positioning trace is generated by the correction positioning trace generation device. The absolute trace generation device generates an absolute trace, which is obtained by synthesizing the correction positioning trace and the correction dead reckoning trace. The correction positioning trace is generated by the correction positioning trace generation device, and the correction dead reckoning trace is generated by the correction dead reckoning trace generation device. The absolute trace memory stores the absolute trace, which is generated by the absolute trace generation device.

According to the above travel trace storage apparatus, the absolute trace is not generated with being corrected in real time. The absolute trace, after the positioning trace and the dead reckoning trace are generated once, is generated by generating the correction positioning trace and the correction dead reckoning trace, which are obtained by correction of the positioning trace and the dead reckoning trace respectively, and by synthesizing the correction positioning trace and the correction dead reckoning trace. Thus, an absolute trace is not generated in real time with generating the positioning trace and the dead reckoning trace. The absolute trace is posteriorly generated, after the positioning trace and the dead reckoning trace are generated and the positioning trace and the dead reckoning trace are corrected, by using the positioning trace and the dead reckoning trace, which have been corrected. Accordingly, it is possible to accurately remove influence by the multipath phenomenon during the generation of the absolute trace, and it is possible to generate the absolute trace more accurately.

BRIEF DESCRIPTION OF THE DRAWINGS

The above and other aspects, features and advantages of the present disclosure will become more apparent from the following detailed description made with reference to the accompanying drawings. In the drawings:

FIG. 10 is a diagram according to the second embodiment of the present disclosure and illustrating an expression to calculate a first transformation matrix for superposing the dead reckoning trace on the positioning trace;

FIG. 11 is a diagram illustrating the first transformation matrix;

FIG. 12 is a diagram illustrating an expression to transform the dead reckoning trace into a transformation dead reckoning trace superposed on the positioning trace;

FIG. 15 is a diagram illustrating an expression to calculate a second transformation matrix for superposing the dead reckoning trace on the correction positioning trace;

FIG. 16 is a diagram illustrating the second transformation matrix;

FIG. 17 is a diagram illustrating an expression to transform the dead reckoning trace into the correction dead reckoning trace superposed on the correction positioning trace;

PREFERRED EMBODIMENTS FOR CARRYING OUT THE INVENTION

First Embodiment

Followingly, a first embodiment in which a travel trace storage apparatus according to the present disclosure is applied to a car navigation device will be explained with reference to FIG. 1 to FIG. 9.

Figure 1:
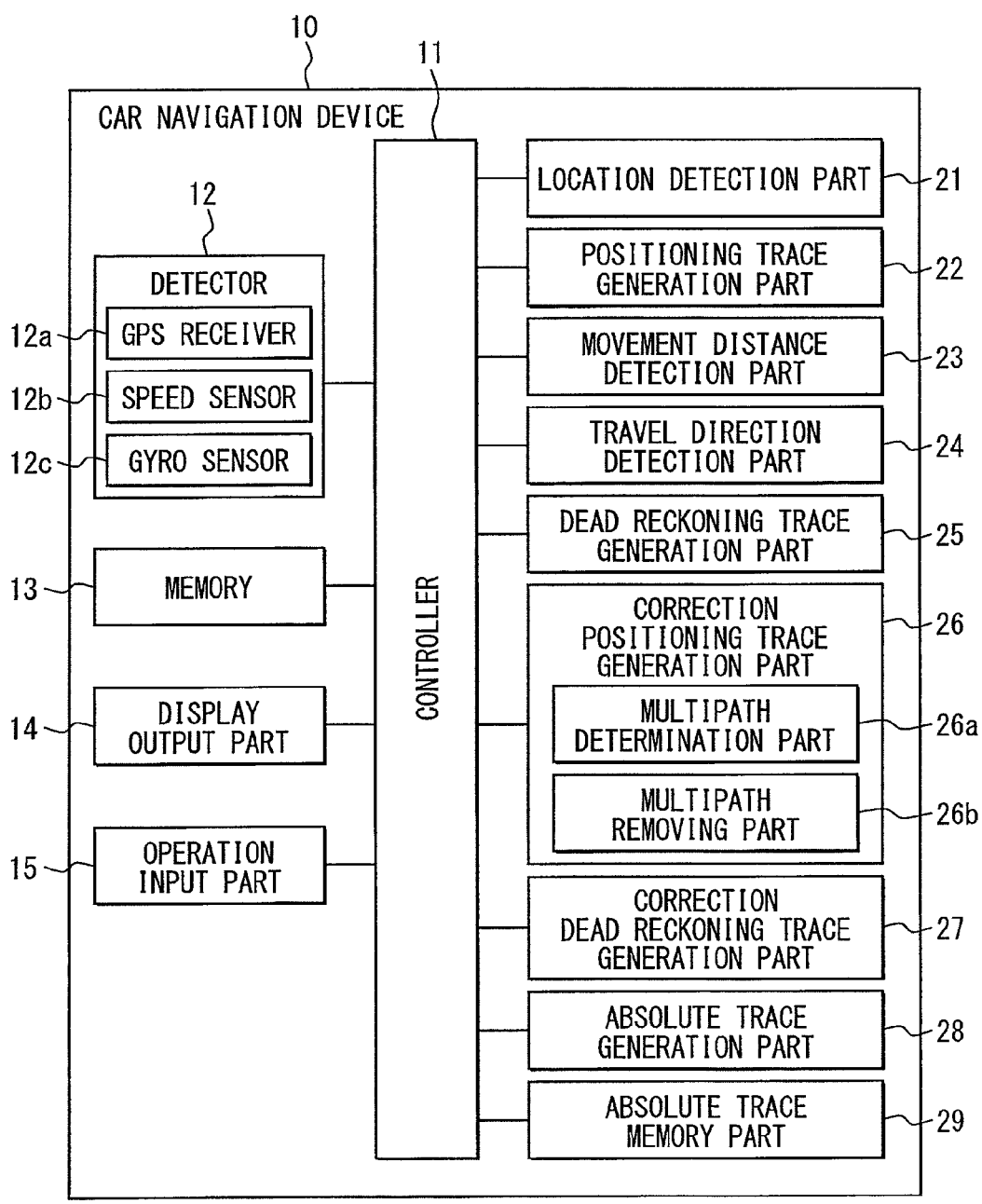
FIG. 1 is a block diagram schematically illustrating a configuration of a car navigation device according to a first embodiment of a present disclosure.

As described in FIG. 1, a car navigation device 10 includes a controller 11, a detector 12, a memory 13, a display output part 14, an operation input part 15, or the like.

The controller 11 is mainly configured from a well-known microcomputer having CPU, RAM, ROM, I/O bus (not shown), or the like. The controller 11 controls an operation of the car navigation device 10 in general, according to a computer program stored in storage medium such as the ROM, the memory 13, or the like.

The controller 11, by executing a computer program, virtually realizes a location detection part 21, a positioning trace generation part 22, a movement distance detection part 23, a travel direction detection part 24, a dead reckoning trace generation part 25, a correction positioning trace generation part 26, a correction dead reckoning trace generation part 27, an absolute trace generation part 28, and an absolute trace memory part 29 by software. The location detection part 21 corresponds to a location detection device according to the present disclosure. The positioning trace generation part 22 corresponds to a positioning trace generation device according to the present disclosure. The movement distance detection part 23 corresponds to a movement distance detection device according to the present disclosure. The travel direction detection part 24 corresponds to a travel direction detection device according to the present disclosure. The dead reckoning trace generation part 25 corresponds to a dead reckoning trace generation device according to the present disclosure. The correction positioning trace generation part 26 corresponds to a correction positioning trace generation device according to the present disclosure. The correction dead reckoning trace generation part 27 corresponds to a correction dead reckoning trace generation device according to the present disclosure. The absolute trace generation part 28 corresponds to an absolute trace generation device according to the present disclosure. The absolute trace memory part 29 corresponds to an absolute trace memory device according to the present disclosure.

The detector 12 includes a global positioning system (GPS: Global Positioning System) receiver 12a, a speed sensor 12b, a gyro sensor 12c, or the like. The GPS receiver 12a receives an electric wave, i.e., a satellite electric wave, which is transmitted from a GPS satellite, which is a satellite for positioning, through a not-shown GPS antenna. The GPS receiver 12a detects the number of the GPS satellites whose electric waves are received by the GPS receiver 12a, for example, according to the number of electric waves that the GPS receiver 12a has received. The speed sensor 12b outputs a pulse signal at intervals according to travel speed of the vehicle. The gyro sensor 12c outputs a detection signal according to angular velocity of a rotation motion applied to the vehicle. The detector 12 inputs a detection data to the controller 11. The detection data is obtained by the GPS receiver 12a, the speed sensor 12b, the gyro sensor 12c, or the like. The controller 11 stores the detection data inputted from the detector 12 into the memory 13.

The memory 13 is configured by the storage medium such as a hard disk drive, a memory card, or the like. The memory 13 stores various information including various data required for trace calculation and various data required for operation control of the car navigation device 10. In addition, the memory 13 stores trace information such as a positioning trace A, a dead reckoning trace B, a correction positioning trace C, a correction dead reckoning trace D, an absolute trace E, or the like, which are described below in detail, and various data required for generating the traces. Incidentally, the trace information such as the positioning trace A, the dead reckoning trace B, the correction positioning trace C, the correction dead reckoning trace D, the absolute trace E, or the like is not necessary to correspond to an entire travel trace of the vehicle, for example, an entire trace from a departure to a destination, and may correspond to a trace in a part of the travel trace of the vehicle.

Figure 2:
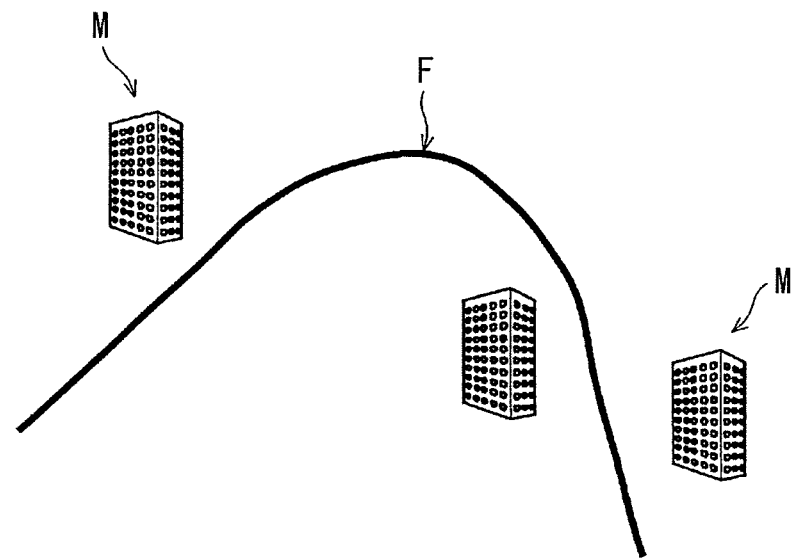
FIG. 2 is a diagram illustrating a true travel trace of the vehicle.

FIG. 2 illustrates a true travel trace F of the vehicle. A spot where the so-called multipath phenomenon is prone to occur exists around the travel trace F. The spot where the so-called multipath phenomenon is prone to occur corresponds to a place with high-rises M or the like. A section, corresponding to the true travel trace F, where the trace information such as the positioning trace A, the dead reckoning trace B, the correction positioning trace C, the correction dead reckoning trace D, the absolute trace E, or the like is generated may be a section corresponding to a case when the number of GPS satellites whose electric waves are received by the location detection part 21 is a predetermined number or more.

The display output part 14 has a display device such as a liquid crystal display, an organic light emitting display, or the like. In the display output part 14, for example, a display image for route guidance of the vehicle, a display image for various operation instructions, a display image for various setting operations, or the like are displayed.

The operation input part 15 has various switch groups such as a mechanical switch placed close to a display of the display output part 14, a touch panel switch placed to the display of the display output part 14, or the like. A user can input various setting operations to the car navigation device 10 with using each switch of the operation input part 15.

The location detection part 21 chronologically detects a location of the vehicle, based on the electric wave that the GPS receiver 12a receives from the GPS satellite.

Figure 3:
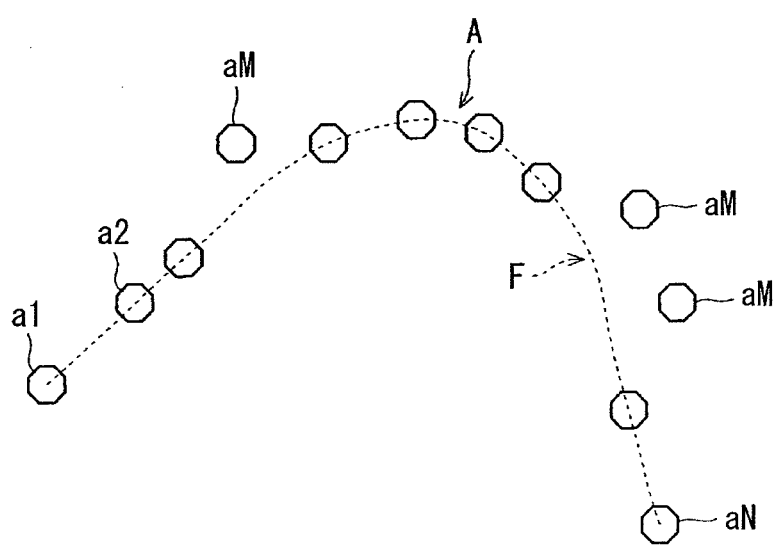
FIG. 3 is a diagram illustrating a positioning trace before correction.

The positioning trace generation part 22, as described in FIG. 3, generates the positioning trace A, in which each of the positions a1 to aN of the vehicle is arranged chronologically. The positions a1 to aN of the vehicle are determined by the location detection part 21. The positioning trace A includes a position aM at which an influence of the so-called multipath phenomenon is received, corresponding to a location where the above high-rises M exist.

In the present embodiment, the positioning trace generation part 22 generates the positioning trace A by chronologically arranging each of the positions a1 to aN of the vehicle. Each of the positions a1 to aN is measured when the number of GPS satellites whose electric waves can be received by the location detection part 21 is a predetermined number or more, for example, five or more than five GPS satellites. Thus, the positioning trace generation part 22 generates the positioning trace A corresponding to a case when the number of GPS satellites whose electric waves can be received by the location detection part 21 is the predetermined number or more. Incidentally, the number of GPS satellites whose electric waves are received is not necessary to be the predetermined number or more in all of the positioning trace A. When, in at least a start point and an end point of the positioning trace A, the number of the GPS satellites may be the predetermined number or more, the number of the GPS satellites may be less than the predetermined number in a middle of the positioning trace A.

The movement distance detection part 23 chronologically detects a movement distance of the vehicle by sampling the pulse signal at every predetermined time, for example, 1 millisecond. The pulse signal outputted by the speed sensor 12b is a signal according to vehicle speed.

The travel direction detection part 24, based on the detection signal that the gyro sensor 12c outputs, chronologically detects the travel direction of the vehicle.

Figure 4:
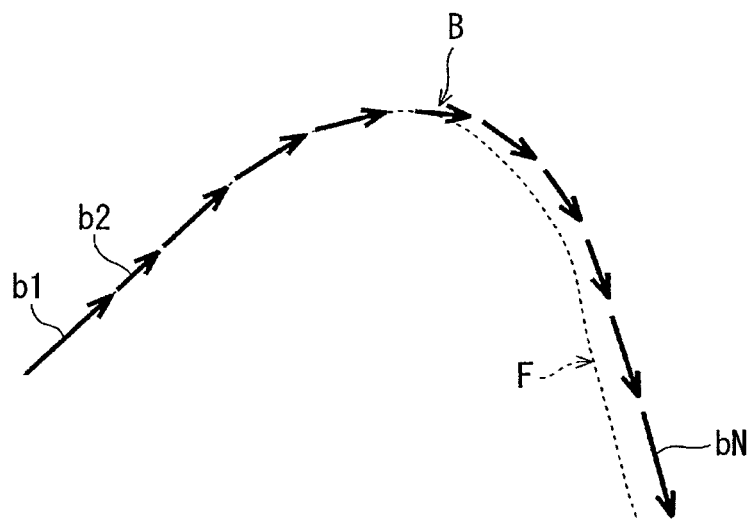
FIG. 4 is a diagram illustrating a dead reckoning trace before correction.

The dead reckoning trace generation part 25, as described in FIG. 4, generates the dead reckoning trace B in which each travel vector b1 to bN is chronologically arranged. Each of the travel vector b1 to bN is determined by the movement distance of the vehicle detected by the movement distance detection part 23, and the travel direction of the vehicle detected by the travel direction detection part 24. The dead reckoning trace B tends to be mismatched to the true travel trace F due to an influence of an accident error of a detection value of the speed sensor 12b, an accident error of voltage value or a gyro gain of the gyro sensor 12c, or the like.

In the present embodiment, the dead reckoning trace generation part 25 chronologically generates the travel vectors b1 to bN with taking a time synchronization with each of the positions a1 to aN which are measured when the number of the GPS satellites whose electric waves can be received by the location detection part 21 is the predetermined number or more, for example, five or more than five GPS satellites. The dead reckoning trace generation part 25 generates the dead reckoning trace B by chronologically arranging the travel vectors b1 to bN. Thus, The dead reckoning trace generation part 25 generates the dead reckoning trace B, with taking a time synchronization to the positioning trace A, corresponding to a case when the dead reckoning trace generation part 25 can receive the electric waves of the predetermined number or more of satellites. Incidentally, the number of GPS satellites whose electric waves can be received is not necessary to be the predetermined number or more in all of the dead reckoning trace B. When, in at least a start point and an end point of the dead reckoning trace B, the number of the GPS satellites may be the predetermined number or more, the number of the GPS satellites may be less than the predetermined number in a middle point of the dead reckoning trace B.

Figure 5:
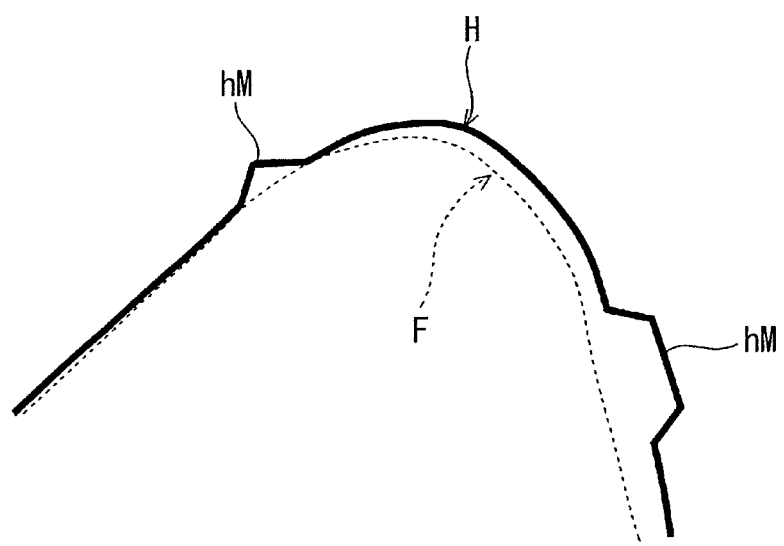
FIG. 5 is a diagram illustrating a conventional absolute trace.
Figure 6:
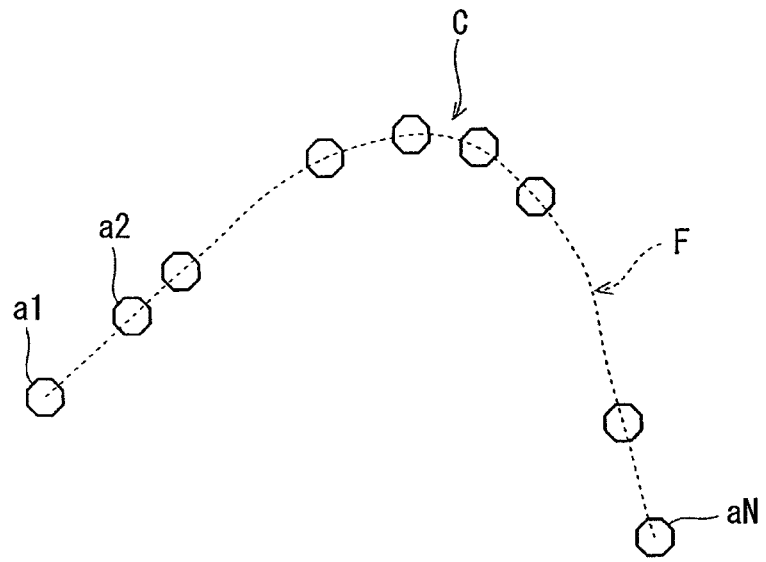
FIG. 6 is a diagram illustrating a correction positioning trace.

Here, conventionally, with generating the positioning trace A and the dead reckoning trace B as described above, the positioning trace A and the dead reckoning trace B are synthesized by a calculation processing with a well-known Kalman filter, so that the absolute trace H described in FIG. 5 is generated. Incidentally, the phrase "the synthesizing the positioning trace A and the dead reckoning trace B" denotes that a magnitude and a direction of each of the travel vectors b1 to bN in the dead reckoning trace B are corrected based on location information, i.e., latitude information and longitude information, of each of the positions a1 to aN included in the positioning trace A.

In this case, the conventional absolute trace H is not obtained by synthesizing the entirety of the positioning trace A and the entirety of the dead reckoning trace B after the entirety of the positioning trace A and the entirety of the dead reckoning trace B are obtained. The conventional absolute trace H is generated by continuously synthesizing the positions a1 to aN with the travel vectors b1 to bN, when each of the positions a1 to aN of the positioning trace A and each of the dead reckoning trace B which has a time synchronization with the each of the positions a1 to aN are obtained. Therefore, for example, when the locations a1, a2 are obtained, and when the travel vector b1 with a time synchronization with the locations a1, a2 is obtained, the positions a1, a2 and the travel vector b1 are synthesized. Further, when the locations a3, a4 are obtained and when the travel vector b2 with a time synchronization with the locations a3, a4 is obtained, the positions a3, a4 and the travel vector b2 are synthesized. The above process is continuously performed and the absolute trace H is partly generated continuously.

In the conventional method, a generation of the positioning trace A, a generation of the dead reckoning trace B, and a generation of the absolute trace H are proceeded in real time in parallel. It is difficult to generate the absolute trace H with removing the location aM at which the detection has been affected by the multipath phenomenon. As a result, the absolute trace H including a part hM affected by the multipath phenomenon may be generated.

Therefore, in the present embodiment, in order to obtain the absolute trace without an influence of the multipath phenomenon, a configuration described below is used.

Thus, the correction positioning trace generation part 26 has a function of a multipath determination part 26a and a function of a multipath removing part 26b, which corresponds to a so-called cleansing function. The multipath determination part 26a determines a location affected by the so-called multipath phenomenon, in each location included in the positioning trace. The multipath removing part 26b removes the location where the multipath phenomenon has affected from the positioning trace. The correction positioning trace generation part 26 generates the correction positioning trace C described in FIG. 6 by a process described below.

Figure 7:
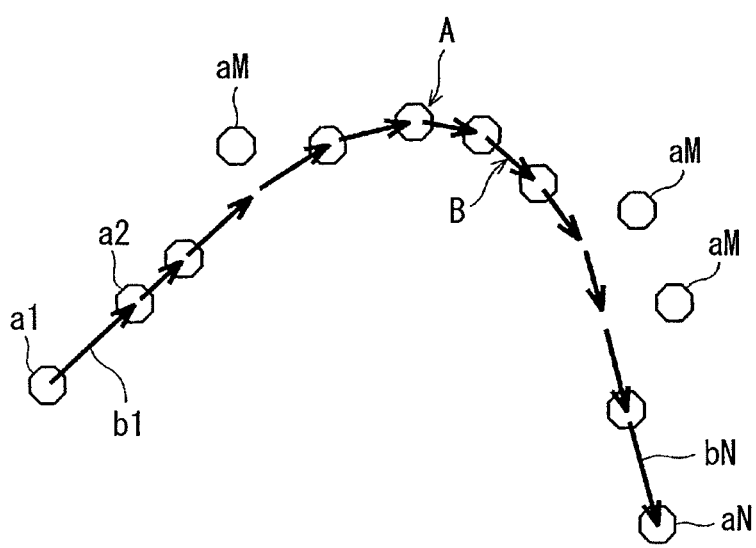
FIG. 7 is a diagram illustrating a superposition of the positioning trace before correction and the dead reckoning trace before correction.

The correction positioning trace generation part 26, as described in FIG. 7, superposes the positioning trace A, which the positioning trace generation part 22 has generated, and the dead reckoning trace B, which the dead reckoning trace generation part 25 has generated. An aspect of superposition may include various aspects. In this case, a time synchronization is taken between each of the positions a1 to aN included in the positioning trace A and each of the travel vectors b1 to bN. Thus, for example, corresponding to a period from a time when a first location a1 of the positioning trace A is detected to a time when a second location a2 is detected, a first travel vector b1 of the dead reckoning trace B is generated. Therefore, since the time synchronization is taken between each of the positions a1 to aN in the positioning trace A and each of the travel vectors b1 to bN in the dead reckoning trace B, the correction positioning trace generation part 26 is set so as to superpose the two positions a1, a2 on a starting location side of the positioning trace A with the travel vector b1 at a starting location side of the dead reckoning trace B. Incidentally, in another aspect, the two positions at an end point side of the positioning trace A and a travel vector at an end point side of the dead reckoning trace B may be superposed, or two positions in a middle of the positioning trace A and another travel vector, which has a time synchronization with the two positions, of the dead reckoning trace B may be superposed.

The correction positioning trace generation part 26 superposes the positioning trace A, which is generated by the positioning trace generation part 22, on the dead reckoning trace B, which is generated by the dead reckoning trace generation part 25, and determines a location aM in each of the positions a1 to aN included in the positioning trace A as a location which has been affected by the multipath phenomenon. The location aM is distant from the dead reckoning trace B by a predetermined distance or more, for example, 15 meters or more on a map data. Incidentally, in this case, a determination of the distance is based on a length of a perpendicular line drawn from each of the positions a1 to aN in the positioning trace A to the dead reckoning trace B. Therefore, a location, in which a length of a perpendicular line drawn from each of the positions a1 to aN to the dead reckoning trace B is the predetermined distance or more, is identified as the location aM at which the detection has been affected by the multipath phenomenon. The correction positioning trace generation part 26 removes the location aM, which has been identified as the location affected by the multipath phenomenon, from the positioning trace A, and accordingly, generates the correction positioning trace C described in FIG. 6.

Figure 8:
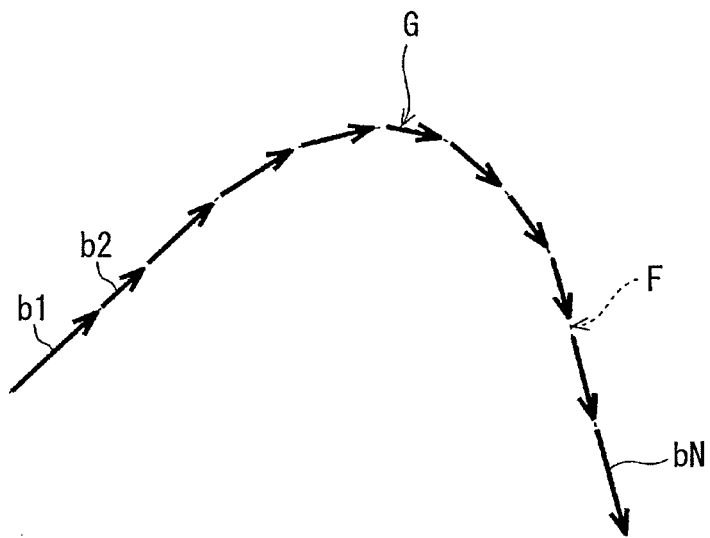
FIG. 8 is a diagram illustrating the correction dead reckoning trace.

The correction dead reckoning trace generation part 27 reads out data, which the dead reckoning trace generation part 25 has used when the dead reckoning trace B is generated, from the memory 13. The data corresponds to each movement distance of the vehicle detected by the movement distance detection part 23, and each travel direction of the vehicle detected by the travel direction detection part 24. The correction dead reckoning trace generation part 27 corrects each of the travel vectors b1 to bN, determined by the data, based on location information of each location included in the correction positioning trace C generated by the correction positioning trace generation part 26, with using a correction process of a well-known Kalman smoother and arranges chronologically. The location information corresponds to the latitude information and the longitude information. The correction dead reckoning trace generation part 27 corrects the dead reckoning trace B to generate the correction dead reckoning trace G. FIG. 8 illustrates the correction dead reckoning trace G. The correction dead reckoning trace G corrected as described above becomes closer to the true travel trace F relative to the dead reckoning trace B. Incidentally, in the correction process by the correction dead reckoning trace generation part 27, an electro voltage correction of the gyro sensor 12c, a correction of the gyro gain of the gyro sensor 12c, a correction of magnitude and a direction of each of the travel vectors b1 to bN that have obtained previously are performed, and accordingly, the correction dead reckoning trace G is generated. Therefore, the correction dead reckoning trace G, after correcting each of the travel vectors b1 to bN providing the dead reckoning trace B, is a dead reckoning trace generated by chronologically rearranging the corrected each of the travel vectors b1 to bN.

Figure 9:
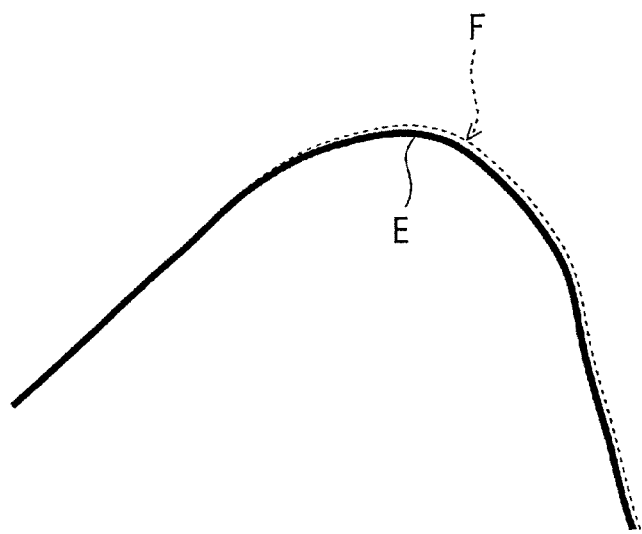
FIG. 9 is a diagram illustrating an absolute trace of the present embodiment.

The absolute trace generation part 28 synthesizes the correction positioning trace C generated by the correction positioning trace generation part 26 and the correction dead reckoning trace G generated by the correction dead reckoning trace generation part 27, with using an calculation process of the well-known Kalman smoother, and accordingly, generates the absolute trace E as described in FIG. 9. Incidentally, the phrase "synthesize the correction positioning trace C and the correction dead reckoning trace G" denotes that the magnitude and the direction of each of the travel vectors b1 to bN included in the correction dead reckoning trace G are corrected based on the positioning information of each of the positions a1 to aN included in the correction positioning trace C, in which the location aM affected by the multipath phenomenon has removed. The positioning information of each of the positions a1 to aN corresponds to the latitude information and the longitude information.

In this case, the absolute trace E is not generated through the calculation process of the above described Kalman filter, in the calculation process where the generation of the positioning trace A, the dead reckoning trace B, and the absolute trace E are proceeded in real time in parallel. The absolute trace E is generated through the calculation process of the Kalman smoother, in the calculation process where a detection value is corrected posteriorly. After the entirety of the positioning trace A and the entirety of the dead reckoning trace B are obtained, the entirety of the positioning trace A is corrected to generate the correction positioning trace C, and the entirety of the dead reckoning trace B is corrected to generate the correction dead reckoning trace G, and then the entirety of the correction positioning trace C is synthesized with the correction dead reckoning trace G to generate the absolute trace E.

The absolute trace memory part 29 stores the absolute trace E that is generated by the absolute trace generation part 28 into the memory 13. The absolute trace E stored in the memory 13, as described above, is used as a travel trace utilized by the car navigation device 10 for learning a road shape, for example.

As described above, according to the car navigation device 10 in the present embodiment, the absolute trace E is not generated in real time in parallel with the generation of the positioning trace A and the dead reckoning trace B. The absolute trace E, after the positioning trace A and the dead reckoning trace B are generated once, is generated by generating the correction positioning trace C and the correction dead reckoning trace G, which are obtained by correction of the positioning trace A and the dead reckoning trace B respectively, and by synthesizing the correction positioning trace C and the correction dead reckoning trace G. Thus, an absolute trace is not generated in real time with generating the positioning trace A and the dead reckoning trace B. The absolute trace E is posteriorly generated, after the positioning trace A and the dead reckoning trace B are generated and the positioning trace A and the dead reckoning trace B are corrected, by using the positioning trace C and the dead reckoning trace G, which have been corrected. Accordingly, it is possible to accurately remove influence by the multipath phenomenon during the generation of the absolute trace E, and it is possible to generate the absolute trace E more accurately.

The car navigation device 10 synthesizes the correction positioning trace C and the correction dead reckoning trace G, which are generated corresponding to a case when the number of the GPS satellites whose electric waves can be received by the location detection part 21 is the predetermined number or more, so that the car navigation device 10 generates the absolute trace E. Accordingly, since the positioning trace A that the positioning trace generation part 22 generates becomes accurate as possible, the correction positioning trace C that is obtained by correcting the positioning trace A becomes accurate as possible, and as a result, the absolute trace E generated by the correction positioning trace C becomes accurate as possible.

Second Embodiment

A second embodiment of the present disclosure will be explained with reference to FIG. 10 to FIG. 18B. The present embodiment is different from the above first embodiment in a method to generate the absolute trace. More specifically, in the present embodiment, instead of generating the absolute trace synthesized from the correction positioning trace and the correction dead reckoning trace, the correction dead reckoning trace obtained based on the positioning trace and the dead reckoning trace, which have been transformed (or, corrected) with a transformation matrix, is generated as the absolute trace. Followingly, aspects different from the first embodiment will be explained.

The correction positioning trace generation part 26 executes a first fitting process. Specifically, the correction positioning trace generation part 26, based on an expression No. 1 described in FIG. 10, calculates the first transformation matrix C1 for superposing the dead reckoning trace B on the positioning trace A. Incidentally, coordinates (Ui, Vi) described in the expression No. 1 correspond to each coordinate data included in the positioning trace A, and coordinates (Xi, Yi) correspond to each coordinate data included in the dead reckoning trace B. Each travel vector included in the dead reckoning trace B is generated based on these coordinate data (Xi, Yi). In addition, as described in FIG. 11, the first transformation matrix C1 includes rotation elements R1, R2 and translational elements T1, T2. Although the first transformation matrix C1 enables to rotate and translate a trace, the first transformation matrix C1 is set as a transformation matrix that can not perform a skew transformation (corresponding to a change with a distortion).

Figure 13A:
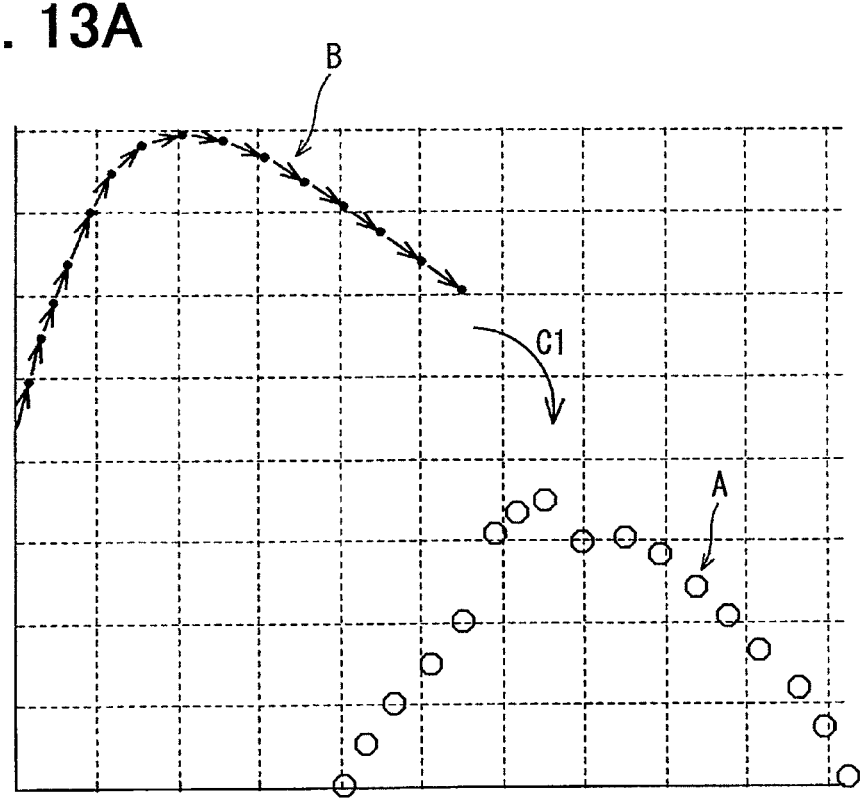
FIG. 13A is a diagram illustrating a status before, by the first transformation matrix, the dead reckoning trace is superposed on the positioning trace and is transformed into the transformation dead reckoning trace.
Figure 13B:
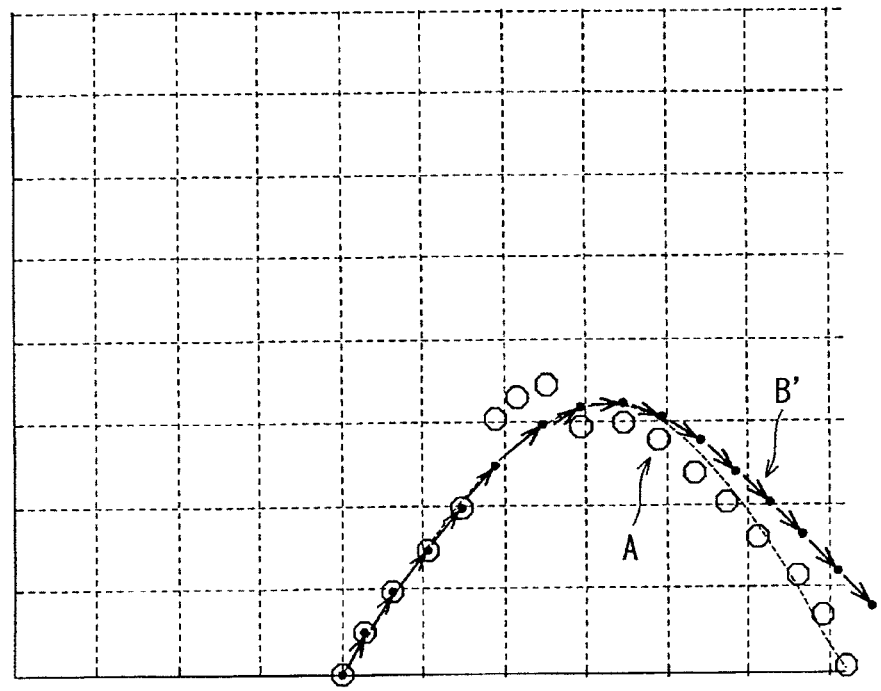
FIG. 13B is a diagram illustrating a status after the dead reckoning trace is transformed into the transformation dead reckoning trace.
Figure 14:
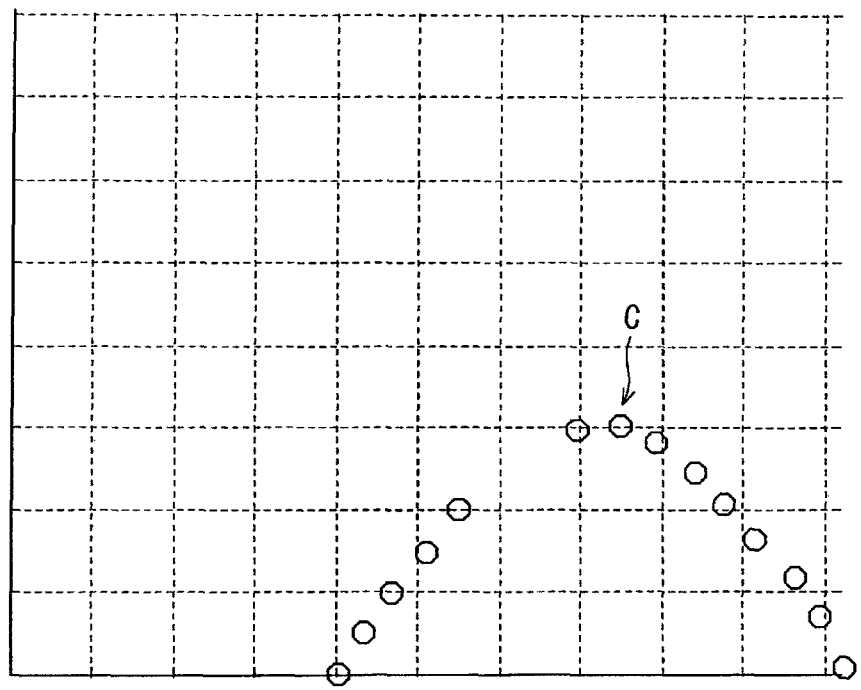
FIG. 14 is a diagram illustrating the correction positioning trace.

The correction positioning trace generation part 26, based on a second expression No. 2 described in FIG. 12, transforms the dead reckoning trace B to a transformation dead reckoning trace B, which is superposed on the positioning trace A, according to the calculated first transformation matrix C1. FIG. 13 visually illustrates an example in which the dead reckoning trace B is superposed on the positioning trace A by the first transformation matrix C1 so that the dead reckoning trace B is transformed into the transformation dead reckoning trace B. More specifically, as described in FIG. 13A, the dead reckoning trace B is transformed by the first transformation matrix C1, so that the dead reckoning trace B is superposed on the positioning trace A (corresponding to the first fitting process). In this case, since the first transformation matrix C1 is a transformation matrix which can not perform the skew transformation, as described in FIG. 13B, the transformation dead reckoning trace B' obtained from the transformation has a low superposition degree (corresponding to a matching degree for the positioning trace A) for the positioning trace A.

The correction positioning trace generation part 26 removes a location which is distant from the transformation dead reckoning trace B' in each location included in the positioning trace A by a predetermined distance or more, in a state where, as described in FIG. 13B, i.e., the positioning trace A is superposed on the transformation dead reckoning trace B. Accordingly, the correction positioning trace generation part 26 generates the correction positioning trace C described in FIG. 14. Incidentally, any suitable value can be set as the predetermined distance.

As described above, the correction positioning trace generation part 26 executes the first fitting process, and a following generation process of the correction positioning trace C.

The correction dead reckoning trace generation part 27 executes a second fitting process. Specifically, the correction dead reckoning trace generation part 27, based on a expression No. 3 described in FIG. 15, calculates a second transformation matrix C2 to superpose the dead reckoning trace B on the correction positioning trace C. Incidentally, coordinates (Ui, Vi) described in the expression No. 3 correspond to each coordinate data included in the correction positioning trace C, coordinates (Xi, Yi) correspond to each coordinate data included in the dead reckoning trace B. However, only the coordinate data of the dead reckoning trace B, corresponding to the positioning trace C, is used. Therefore, the total number of each coordinate data of the dead reckoning trace B is less than the total number n of data. In addition, as described in FIG. 16, the second transformation matrix C2 has multiple elements (in this case, c1, c2, c3, c4, c5, and c6) different from each other, and the second transformation matrix C2 is set as a transformation matrix that can perform a skew transformation (corresponding to a change with a distortion).

Figure 18A:
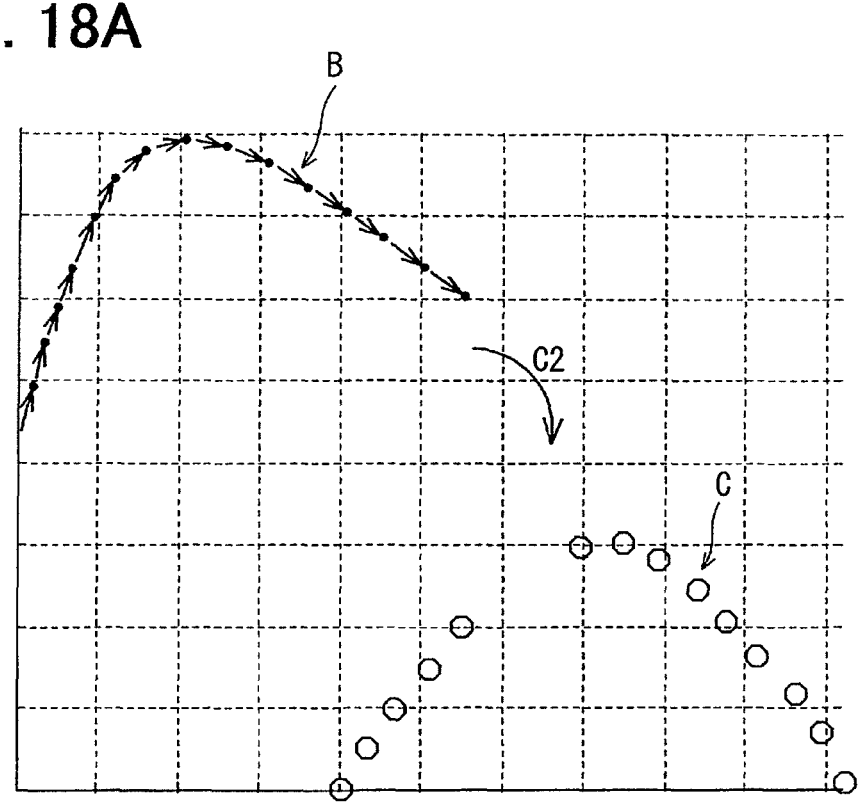
FIG. 18A is a diagram illustrating a status before, by the second transformation matrix, the dead reckoning trace is superposed on the correction positioning trace and is transformed into the correction dead reckoning trace.
Figure 18B:
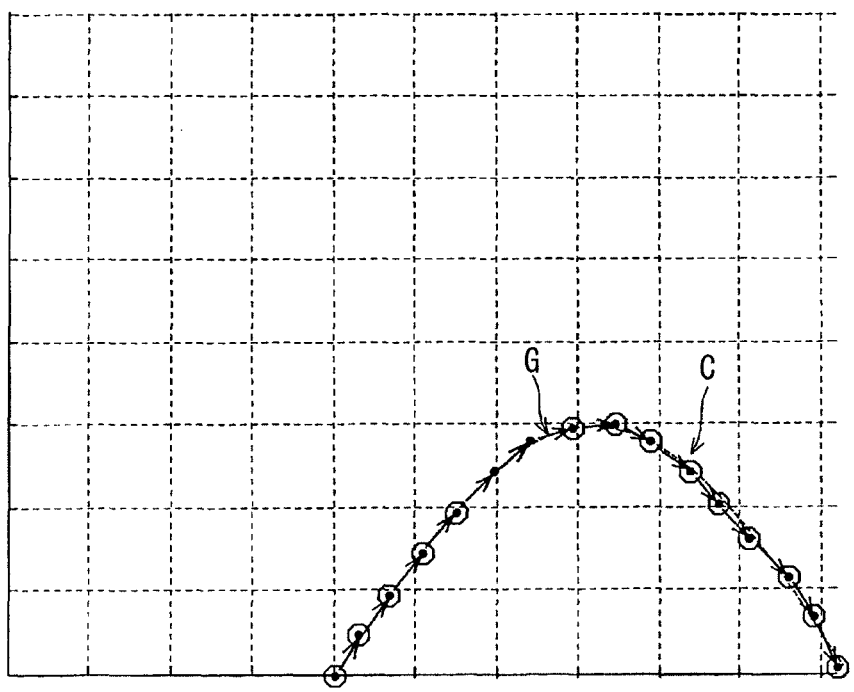
FIG. 18B is a diagram illustrating a status after the dead reckoning trace is transformed into the correction dead reckoning trace.

The correction dead reckoning trace generation part 27, based on an expression No. 4 described in FIG. 17, transforms the dead reckoning trace B to the correction dead reckoning trace G, which is superposed on the correction positioning trace C, according to the calculated second transformation matrix C2. FIG. 18A and FIG. 18B visually illustrate an example in which the dead reckoning trace B is superposed on the correction positioning trace C by the second transformation matrix C2 so that the dead reckoning trace B is transformed into the correction dead reckoning trace G. More specifically, as described in FIG. 18A, the dead reckoning trace B is transformed by the second transformation matrix C2, so that the dead reckoning trace B is superposed on the correction positioning trace C (corresponding to the second fitting process). In this case, since the second transformation matrix C2 is a transformation matrix which can perform the skew transformation, as described in FIG. 18B, the correction dead reckoning trace G obtained from the transformation has a high superposition degree (corresponding to a matching degree for the correction positioning trace C) for the correction positioning trace C.

As described above, the correction dead reckoning trace generation part 27 executes the second fitting process and a following generation process of the correction dead reckoning trace G.

The absolute trace generation part 28 generates the correction dead reckoning trace G, which the correction dead reckoning trace generation part 27 has generated, as the absolute trace E. The absolute trace memory part 29 stores the absolute trace E, which the absolute trace generation part 28 has generated, into the memory 13.

According to the above explained present embodiment, it is possible to accurately remove the influence by the multipath phenomenon during the generation of the absolute trace E, and it is possible to generate the absolute trace E more correctly.

In addition, the positioning trace A is a jagged trace with much random noise. Accordingly, even when the positioning trace A is corrected and the correction positioning trace C is generated, the correction positioning trace C includes random noise to some extent and a trace of the correction positioning trace C tends to be a jagged trace. According to the present embodiment, since the dead reckoning trace B is transformed into the correction dead reckoning trace G with using the second transformation matrix C2, which can perform the skew transformation, it is possible to average and absorb the random noise included in the correction positioning trace C by transforming and superposing the dead reckoning trace B, so that it is possible to obtain the absolute trace E with an extremely smooth curve and a high accuracy.

Another Embodiment

Incidentally, the present disclosure is not limited to the above described each embodiment, and it may be applied to various embodiments without departing from the scope of the disclosure. For example, it is possible that the present disclosure is modified or extended as described below.

The first transformation matrix C1 may be set as a transformation matrix that can superpose the positioning trace A on the dead reckoning trace B. In this case, the correction positioning trace generation part 26 removes a location which is distant from the dead reckoning trace B in each location included in the positioning trace A (corresponding to a transformation positioning trace A, not shown) by a predetermined distance or more, under a condition that the positioning trace A (corresponding to the transformation positioning trace A') after transformation is superposed on the dead reckoning trace B, and the correction positioning trace generation part 26 generates the correction positioning trace C.

A section where the absolute trace E is generated may be selected so that the section has one road bend. Accordingly, it is possible to generate the absolute trace E more accurately. When a section where the absolute trace E is generated has multiple road bends, the section may be divided into multiple sections so that a divided section has one road bend. The absolute trace E may be generated for each of the divided sections, and the generated multiple absolute traces E may be connected (synthesized).

It is preferable that the first transformation matrix C1 and the second transformation matrix C2 are set as a linear transformation matrix of homogeneous coordinate system. For example, the first transformation matrix C1 and the second transformation matrix C2 may be calculated by a linear regression method, a random sample consensus (RANSAC) method, a robust estimation method, or the like.

The absolute trace generation part 28 may be configured to generate the absolute trace E by synthesizing the correction positioning trace C and the correction dead reckoning trace G, which are generated corresponding to a case when the number of the GPS satellites whose electric waves can be received by the location detection part 21 is the predetermined number or more and when each movement distance of the vehicle which the movement distance detection part 23 has detected is the predetermined value or more. Alternatively, the absolute trace generation part 28 may be configured to generate the absolute trace E by synthesizing the correction positioning trace C and the correction dead reckoning trace G, which are generated corresponding to a case when the number of the GPS satellites whose electric waves can be received by the absolute trace generation part 28 is the predetermined number or more, when each movement distance of the vehicle which the movement distance detection part 23 has detected is the predetermined value or more, and when each travel direction of the vehicle which the travel direction detection part 24 has detected is detected within a predetermined range. Accordingly, it is possible to obtain the more accurate absolute trace E.

A positioning satellite is not limited to the GPS satellite. For example, the positioning satellite may be a global navigation satellite system (GLONSS). In this case, the car navigation device 10, instead of the GPS receiver 12a, includes a GLONASS receiver.

The travel trace storage apparatus according to the present disclosure is not limited to a configuration that is integrally provided in a car navigation device, and the travel trace storage apparatus may be a configuration that is separately provided from the car navigation device. The travel trace storage apparatus may be integrally provided in a device other than the car navigation device.

The above disclosure includes the following aspect.

The travel traces storage apparatus in the aspect of the present disclosure includes a location detection device, a positioning trace generation device, a movement distance detection device, a travel direction detection device, a dead reckoning trace generation device, a correction positioning trace generation device, a correction dead reckoning trace generation device, an absolute trace generation device, and an absolute trace memory. The location detection device chronologically detects a vehicle location based on an electric wave received from a satellite. The positioning trace generation device generates a positioning trace, in which each of vehicle locations is chronologically arranged. Each of vehicle locations has been measured by the location detection device. The movement distance detection device chronologically detects a vehicle movement distance. The travel direction detection device chronologically detects a vehicle travel direction. The dead reckoning trace generation device generates a dead reckoning trace, in which each vector is chronologically arranged. Each vector is determined by a corresponding vehicle movement distance detected by the movement distance detection device, and a respective vehicle travel direction is detected by the travel direction detection device. The correction positioning trace generation device generates a correction positioning trace, which is obtained by removing a location that is distant from the dead reckoning trace by a predetermined distance or more from each of locations included in the positioning trace under a condition that the positioning trace generated by the positioning trace generation device is superposed on the dead reckoning trace generated by the dead reckoning trace generation device. The correction dead reckoning trace generation device generates a correction dead reckoning trace, which is obtained by correcting the dead reckoning trace based on the correction positioning trace. The dead reckoning trace is generated by the dead reckoning trace generation device, and the correction positioning trace is generated by the correction positioning trace generation device. The absolute trace generation device generates an absolute trace, which is obtained by synthesizing the correction positioning trace and the correction dead reckoning trace. The correction positioning trace is generated by the correction positioning trace generation device, and the correction dead reckoning trace is generated by the correction dead reckoning trace generation device. The absolute trace memory stores the absolute trace, which is generated by the absolute trace generation device.

According to the above travel trace storage apparatus, the absolute trace is not generated with being corrected in real time. The positioning trace and the dead reckoning trace are once generated, the correction positioning trace and the correction dead reckoning trace, which are respectively obtained by correcting the positioning trace and the dead reckoning trace, are generated, and the absolute trace is generated by synthesizing the correction positioning trace and the correction dead reckoning trace. Thus, the absolute trace is not generated in real time with generating the positioning trace and the dead reckoning trace. The positioning trace and the dead reckoning trace are generated. After correcting the positioning trace and the dead reckoning trace, the absolute trace is posteriorly generated by using the positioning trace and the dead reckoning trace, which have been corrected. Accordingly, when the absolute trace is generated, it is possible to remove the influence by the multipath phenomenon correctly and it is possible to generate the absolute trace more accurately.

Alternatively, the correction positioning trace generation device may calculate a first transformation matrix for superposing the dead reckoning trace on the positioning trace, transform the dead reckoning trace into a transformation dead reckoning trace, which is superposed on the positioning trace, by the first transformation matrix, and remove another location that is distant from the transformation dead reckoning trace by a predetermined distance or more from the locations included in the positioning trace under a condition that the positioning trace is superposed on the transformation dead reckoning trace, so that the correction positioning trace is generated. The correction dead reckoning trace generation device may calculate a second transformation matrix for superposing the dead reckoning trace on the correction positioning trace, and transform the dead reckoning trace to be superposed on the correction positioning trace by the second transformation matrix, so that the correction dead reckoning trace is generated. The absolute trace generation device may generate the correction dead reckoning trace, which is generated by the correction dead reckoning trace generation device, as the absolute trace. In this case, since the absolute trace is generated based on the positioning trace and the dead reckoning trace that have been transformed by the transformation matrix, it is possible to obtain and store a more accurate absolute trace.

Alternatively, the first transformation matrix may be a transformation matrix that does not perform a skew transformation (a change with a distortion) for the dead reckoning trace. The second transformation matrix may be another transformation matrix that performs the skew transformation for the dead reckoning trace.

Alternatively, the first transformation matrix may be another transformation matrix that superposes the positioning trace on the dead reckoning trace.

Alternatively, the absolute trace generation device may generate the absolute trace by synthesizing the correction positioning trace and the correction dead reckoning trace. The correction positioning trace and the correction dead reckoning trace are generated corresponding to a case where a total number of satellites, whose electric waves are received by the location detection device, is a predetermined number or more. In this case, since the positioning trace that the positioning trace generation device generates becomes accurate as possible, the correction positioning trace obtained by a correction of the positioning trace also becomes accurate as possible and it is possible that the absolute trace generated from the correction positioning trace becomes accurate as possible.

Alternatively, the absolute trace generation device may generate the absolute trace by synthesizing the correction positioning trace and the correction dead reckoning trace. The correction positioning trace and the correction dead reckoning trace may be generated corresponding to a case where the total number of the satellite, whose electric waves are received by the location detection device, is a predetermined number or more, and a case where each of the vehicle movement distances that the movement distance detection device has detected is a predetermined value or more.

Alternatively, the absolute trace generation device may generate the absolute trace by synthesizing the correction positioning trace and the correction dead reckoning trace. The correction positioning trace and the correction dead reckoning trace are generated corresponding to a case where the total number of the satellite, whose electric waves are received by the location detection device, is a predetermined number or more, a case where each of the vehicle movement distances that the movement distance detection device has detected is a predetermined value or more, and a case where each of the vehicle travel directions detected by the travel direction detection device is detected within a predetermined range.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A travel trace storage apparatus comprising:
a location detection device for chronologically detecting a vehicle location based on an electric wave received from a satellite;
a positioning trace generation device for generating a positioning trace, in which each of vehicle locations is chronologically arranged, each of vehicle locations having been measured by the location detection device;
a movement distance detection device for chronologically detecting a vehicle movement distance;
a travel direction detection device for chronologically detecting a vehicle travel direction;
a dead reckoning trace generation device for generating a dead reckoning trace, in which each vector is chronologically arranged, each vector being determined by a corresponding vehicle movement distance detected by the movement distance detection device, and a respective vehicle travel direction being detected by the travel direction detection device;
a correction positioning trace generation device for generating a correction positioning trace, which is obtained by removing a location that is distant from the dead reckoning trace by a predetermined distance or more from each of locations included in the positioning trace under a condition that the positioning trace generated by the positioning trace generation device is superposed on the dead reckoning trace generated by the dead reckoning trace generation device;
a correction dead reckoning trace generation device for generating a correction dead reckoning trace, which is obtained by correcting the dead reckoning trace based on the correction positioning trace, the dead reckoning trace being generated by the dead reckoning trace generation device, and the correction positioning trace being generated by the correction positioning trace generation device;
an absolute trace generation device for generating an absolute trace, which is obtained by synthesizing the correction positioning trace and the correction dead reckoning trace, the correction positioning trace being generated by the correction positioning trace generation device, and the correction dead reckoning trace being generated by the correction dead reckoning trace generation device; and
an absolute trace memory for storing the absolute trace, which is generated by the absolute trace generation device.

2. The travel trace storage apparatus according to claim 1, wherein:
the correction positioning trace generation device
calculates a first transformation matrix for superposing the dead reckoning trace on the positioning trace,
transforms the dead reckoning trace into a transformation dead reckoning trace, which is superposed on the positioning trace, by the first transformation matrix,
removes another location that is distant from the transformation dead reckoning trace by a predetermined distance or more from the locations included in the positioning trace under a condition that the positioning trace is superposed on the transformation dead reckoning trace, and
generates the correction positioning trace;
the correction dead reckoning trace generation device
calculates a second transformation matrix for superposing the dead reckoning trace on the correction positioning trace, and
transforms the dead reckoning trace to be superposed on the correction positioning trace by the second transformation matrix, so that the correction dead reckoning trace is generated; and
the absolute trace generation device
generates the correction dead reckoning trace as the absolute trace, the correction dead reckoning trace being generated by the correction dead reckoning trace generation device.

3. The travel trace storage apparatus according to claim 2, wherein:
the first transformation matrix is a transformation matrix that does not perform a skew transformation for the dead reckoning trace; and
the second transformation matrix is another transformation matrix that performs the skew transformation for the dead reckoning trace.

4. The travel trace storage apparatus according to claim 2, wherein:
the first transformation matrix is another transformation matrix that superposes the positioning trace on the dead reckoning trace.

5. The travel trace storage apparatus according to claim 1, wherein:
the absolute trace generation device generates the absolute trace by synthesizing the correction positioning trace and the correction dead reckoning trace; and
the correction positioning trace and the correction dead reckoning trace are generated corresponding to a case where a total number of satellites, whose electric waves are received by the location detection device, is a predetermined number or more.

6. The travel trace storage apparatus according to claim 1, wherein:
the absolute trace generation device generates the absolute trace by synthesizing the correction positioning trace and the correction dead reckoning trace; and
the correction positioning trace and the correction dead reckoning trace are generated corresponding to
a case where a total number of satellites, whose electric waves are received by the location detection device, is a predetermined number or more, and
a case where each of vehicle movement distances that the movement distance detection device has detected is a predetermined value or more.

7. The travel trace storage apparatus according to claim 1, wherein:
the absolute trace generation device generates the absolute trace by synthesizing the correction positioning trace and the correction dead reckoning trace; and
the correction positioning trace and the correction dead reckoning trace are generated corresponding to
a case where a total number of satellites, whose electric waves are received by the location detection device, is a predetermined number or more,
a case where each of vehicle movement distances that the movement distance detection device has detected is a predetermined value or more, and
a case where each of vehicle travel directions detected by the travel direction detection device is detected within a predetermined range.

* * * * *